United States Patent
Yadav et al.

(10) Patent No.: US 11,379,412 B2
(45) Date of Patent: Jul. 5, 2022

(54) ENABLING DATA REPLICATION PROCESSES BETWEEN HETEROGENEOUS STORAGE SYSTEMS

(71) Applicant: NetApp Inc., Sunnyvale, CA (US)

(72) Inventors: Vikas Yadav, Morrisville, NC (US); Rajesh Desai, Sunnyvale, CA (US); Akhil Kaushik, San Jose, CA (US)

(73) Assignee: NetApp Inc., San Jose, CA (US)

( * ) Notice: Subject to any disclaimer, the term of this patent is extended or adjusted under 35 U.S.C. 154(b) by 0 days.

(21) Appl. No.: 16/819,246

(22) Filed: Mar. 16, 2020

(65) Prior Publication Data
US 2020/0218695 A1 Jul. 9, 2020

Related U.S. Application Data

(63) Continuation of application No. 14/340,430, filed on Jul. 24, 2014, now Pat. No. 10,628,380.

(51) Int. Cl.
*G06F 16/13* (2019.01)

(52) U.S. Cl.
CPC .................. *G06F 16/13* (2019.01)

(58) Field of Classification Search
CPC ...................................... G06F 16/13
See application file for complete search history.

(56) References Cited

U.S. PATENT DOCUMENTS

| | | | |
|---|---|---|---|
| 5,432,912 A | 7/1995 | Kihara | |
| 6,324,581 B1 | 11/2001 | Xu et al. | |
| 7,149,858 B1 | 12/2006 | Kiselev et al. | |
| 7,603,372 B1 | 10/2009 | Honicky, Jr. et al. | |
| 7,769,722 B1 * | 8/2010 | Bergant | G06F 16/125 707/681 |
| 8,285,817 B1 | 10/2012 | Balasubramanian et al. | |
| 8,452,856 B1 | 5/2013 | Lent et al. | |
| 8,484,164 B1 | 7/2013 | Sivakumar et al. | |
| 8,655,848 B1 | 2/2014 | Leverett et al. | |

(Continued)

FOREIGN PATENT DOCUMENTS

WO 2013022582 A2 2/2013

OTHER PUBLICATIONS

International Search Report and Written Opinion for Application No. PCT/US2014/053011 dated Dec. 11, 2014, 10 pages.

(Continued)

*Primary Examiner* — Kannan Shanmugasundaram
(74) *Attorney, Agent, or Firm* — Cooper Legal Group, LLC (57) ABSTRACT

A system and method for enabling data replication is described. A set of protocol messages can be associated with a set of corresponding set of requests. The associated set of protocol messages can be provided to each of a source storage system and a destination storage system. The source storage system and the destination storage system can be heterogeneous storage systems that implement different types of file systems or file layouts. The source storage system and the destination storage system are enabled to perform a data replication process, in which at least a set of data is to be replicated from the source storage system to the destination storage system, using at least a protocol message from the associated set of protocol messages. The protocol message can correspond to a request for a list of snapshots stored at the source storage system.

20 Claims, 5 Drawing Sheets

(56) References Cited

U.S. PATENT DOCUMENTS

| | | |
|---|---|---|
| 10,628,380 B2 | 4/2020 | Yadav et al. |
| 2002/0174194 A1 | 11/2002 | Mooney et al. |
| 2003/0009480 A1 | 1/2003 | Lin et al. |
| 2003/0177107 A1 | 9/2003 | Brown et al. |
| 2004/0098417 A1 | 5/2004 | Nishikawa et al. |
| 2004/0123154 A1 | 6/2004 | Lippman et al. |
| 2004/0220933 A1 | 11/2004 | Walker et al. |
| 2005/0010838 A1 | 1/2005 | Davies et al. |
| 2005/0120008 A1 | 6/2005 | Harris et al. |
| 2005/0125503 A1 | 6/2005 | Iyengar et al. |
| 2006/0004765 A1 | 1/2006 | Anderson et al. |
| 2006/0015507 A1 | 1/2006 | Butterworth et al. |
| 2006/0282485 A1 | 12/2006 | Aggarwal et al. |
| 2007/0055703 A1 | 3/2007 | Zimran et al. |
| 2007/0088702 A1 | 4/2007 | Fridella et al. |
| 2007/0094354 A1 | 4/2007 | Soltis |
| 2007/0168046 A1 | 7/2007 | Misawa et al. |
| 2007/0185881 A1 | 8/2007 | Menneau et al. |
| 2008/0010411 A1 | 1/2008 | Yang et al. |
| 2008/0294748 A1 | 11/2008 | Brown et al. |
| 2010/0070726 A1 | 3/2010 | Ngo et al. |
| 2011/0071980 A1* | 3/2011 | Patterson ............... G06F 3/0611 707/626 |
| 2011/0184912 A1* | 7/2011 | Baptist ................ G06F 16/1844 707/639 |
| 2012/0041829 A1 | 2/2012 | Rothschild et al. |
| 2013/0054530 A1 | 2/2013 | Baker et al. |
| 2014/0165176 A1 | 6/2014 | Ow |
| 2014/0250075 A1* | 9/2014 | Broido ................. G06F 16/128 707/639 |

OTHER PUBLICATIONS

"NFS Version 3: Design and Implementation"; Jun. 1994; Brian Pawlowski, Dhet Juszczak, Peter Staubach, Carl Smith, Diane Lebel and David Hitz; In Proceedings of the Summer 1994 USENIX Technical Conference, Reprinted from the Internet at: http://people.cs.pitt.edu/-manas/courses/2510/nfs3.pdf, 15 pages.

\* cited by examiner

ENABLING DATA REPLICATION PROCESSES BETWEEN HETEROGENEOUS STORAGE SYSTEMS

RELATED APPLICATIONS

This application claims priority to and is a continuation of U.S. application Ser. No. 14/340,430, filed on Jul. 24, 2014, now allowed, titled "ENABLING DATA REPLICATION PROCESSES BETWEEN HETEROGENEOUS STORAGE SYSTEMS," which is incorporated herein by reference.

BACKGROUND

Storage systems can perform data replication processes to back up data for purposes of enhancing user accessibility to data or protecting data for potential system faults. For example, a source storage system can replicate data stored in a storage element, e.g., a disk, a volume, or a file system, by copying the data to a destination storage system.

DETAILED DESCRIPTION

Examples described herein provide for a system and method to enable data replication to be performed between heterogeneous storage system by using a defined protocol (e.g., a general-purpose control protocol). The protocol can be used by the storage systems for performing snapshot-based data replication, including both incremental replication and full replication. For example, a source storage system and a destination storage system can use the protocol to communicate and negotiate with each other for purposes of arranging and managing a data replication process. Still further, in some examples, the protocol can be used to implement different types of data replications across heterogeneous storage systems that support the use of snapshots (e.g., mirroring, periodic backup, cascading backup between three or more storage systems, etc.).

According to an example, a set of protocol messages can be defined and associated with a corresponding set of requests. The associated set of protocol messages can be provided to each of multiple storage systems, including a source storage system and a destination storage system that implement different types of file systems or file layouts (e.g., heterogeneous storage systems). By providing the associated set of protocol messages to the storage systems, the source storage system and the destination storage system can be enabled to perform data replication processes, in which at least a set of data is to be replicated from the source storage system to the destination storage system. In one example, the source storage system and/or the destination storage system can use at least a protocol message corresponding to a request for a list of snapshots stored at the source storage system in order to coordinate a data replication process between the storage systems.

As used herein, a "source storage system" can refer to a storage system that is a source of a data replication process, and a "destination storage system" can refer to a storage system that is a destination or target of the data replication process in which data from the source storage system is to be transferred or copied to. Also as used herein, a snapshot is a read-only copy or image of a state of a storage element, such as a disk, a volume, or a file system, etc., at a particular point in time. In other words, a snapshot is a representation (e.g., using a set of reference markers or pointers to data) of a storage element (that is stored on a persistent storage device) at a point in time. The snapshot can contain information about the data in a storage element, including metadata about the data. As described, storage systems can implement the defined protocol to perform data replication using one or more snapshots.

For example, a source storage system and a destination storage system can use protocol messages to negotiate and establish a session for performing a data replication process. In one example, the destination storage system can transmit a first protocol message corresponding to a request for a reference snapshot. The source storage system can create a new snapshot or find an existing snapshot in response to the request, apply a lock to the reference snapshot for the destination storage system, and provide an identifier of the reference snapshot to the destination storage system. The destination storage system can then transmit a second protocol message corresponding to a request for a plurality of snapshots (e.g., a list) stored at the source storage system. The source storage system can provide a plurality of snapshot identifiers associated with the identifier of the destination storage system to the destination storage system, thereby enabling the destination storage system to initiate a data replication process using information from the plurality of snapshot identifiers.

Depending on implementation, different data replication processes can be performed using the defined protocol messages, including using information about snapshots exchanged between the storage systems. In addition, by associating a set of protocol messages with a corresponding set of requests across different types of storage systems, heterogeneous storage systems can communicate with each other for purposes of performing data replication processes. In this manner, cross-platform data replication can be possible between systems that are developed by different manufacturers or vendors or run different replication software, operating systems, or file layouts. For example, the source storage system and the destination storage system can run different replication software, so that the software does not have to originate from the same storage vendor.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. Examples described herein may be implemented, in whole or in part, on computing devices such as servers, desktop computers, cellular or smartphones, personal digital assistants (e.g., PDAs), laptop computers, printers, digital picture frames, network equipments (e.g., routers) and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples can be carried and/or executed. In particular, the numerous machines shown with examples include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

System Description

Figure 1:
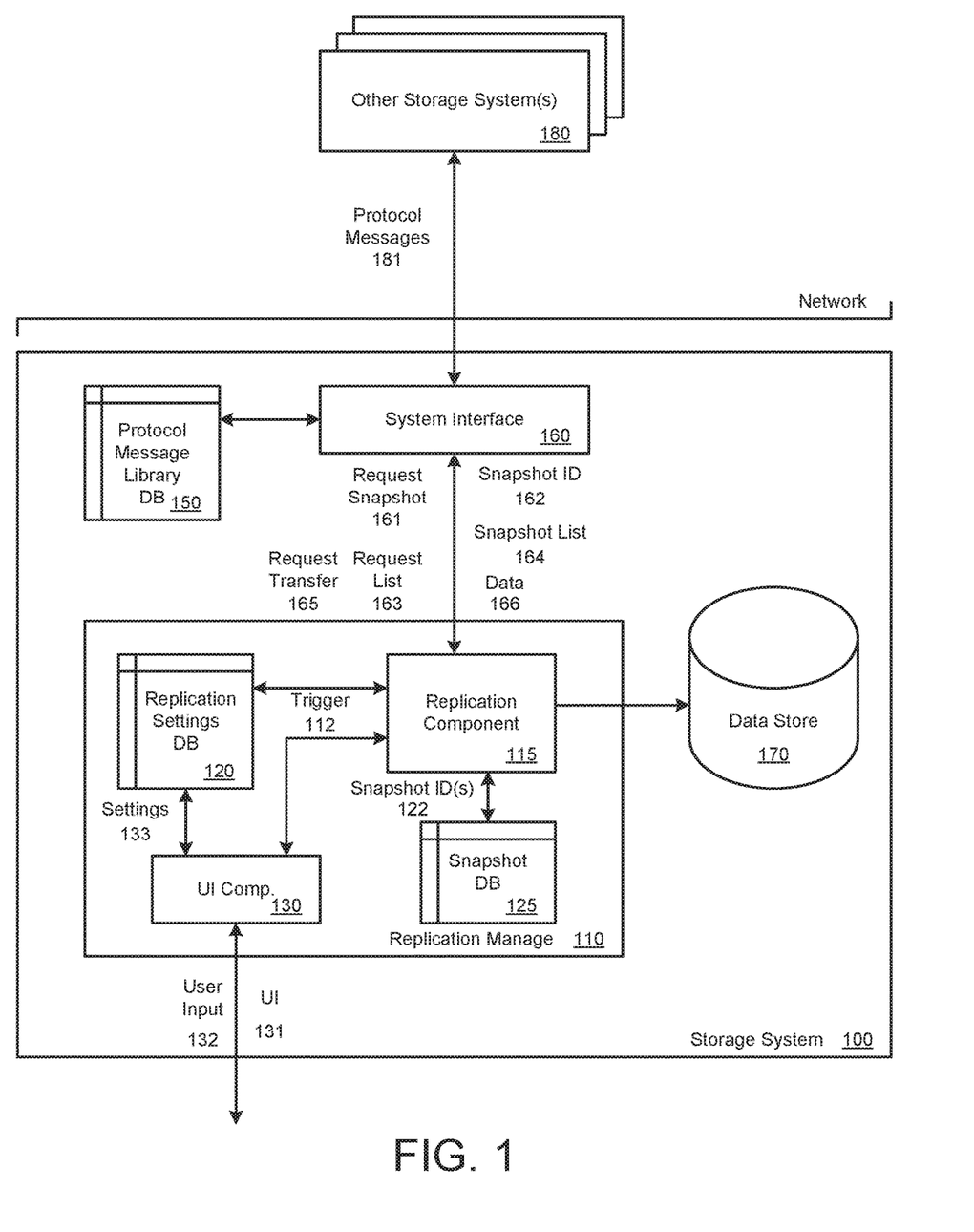
FIG. 1 illustrates an example system to enable data replication using a predefined protocol.

FIG. 1 illustrates an example system to enable data replication using a predefined protocol. For example, a source storage system and a destination storage system can use a predefined protocol to communicate and negotiate with each other for purposes of arranging and managing a data replication process.

According to some examples, a storage system 100 can correspond to a destination storage system or a source storage system, or in some cases, both a destination and a source storage system for implementing cascading data replication between three or more storage systems. Accordingly, the one or more other storage systems 180 that the storage system 100 can communicate with, such as illustrated in FIG. 1, can include similar (or identical) components described with respect to the storage system 100.

In one example, the storage system 100 can include a replication manage 110, a protocol message library database 150, a system interface 160, and a data store 170. Depending on implementation, one or more components of the storage system 100 can be implemented on a computing device, such as a server, laptop, PC, etc., or on multiple computing devices that can communicate with a fleet or set of devices over one or more networks. For example, the replication manage 110, the protocol message library database, and the system interface 160 can be implemented on a server that is in communication with a separate plurality of disk arrays that comprise the data store 170. The storage system 100 can also be implemented through other computer systems in alternative architectures (e.g., peer-to-peer networks, etc.). Logic can be implemented with various applications (e.g., software) and/or with firmware or hardware of a computer system that implements the storage system 100.

The storage system 100 can also communicate, over one or more networks via a network interface (e.g., wirelessly or using a wireline), with one or more other storage systems, such as other storage systems 180, using a system interface 160. The system interface 160 can enable and manage communications between the storage system 100 and the other storage system(s) 180. Data that is to be replicated can also be transmitted between the storage systems 100, 180 using the system interface 160. As referred to herein, each of the storage system 100 and other storage systems 180 can correspond to an end point, or a network addressable unit of storage that supports the use of snapshots.

For simplicity and for illustrative purposes, the storage system 100 is described in FIG. 1 as being a destination storage system in which data from another storage system 180 (e.g., a source storage system) can be replicated and stored in the storage system 100. For example, the storage system 100 can be used to backup a set of data stored at a source storage system. Referring to FIG. 1, the replication manage 110 can control data replication processes that are performed on the storage system 100. Depending on variations, the replication manage 110 can include a replication component 115, a replication settings database 120, a snapshot database 125, and a user interface (UI) component 130.

The snapshot database 125 can store a plurality of snapshots that are created by the replication manage 110 (e.g., via a snapshot component, not shown in FIG. 1). As discussed, a snapshot is a read-only copy or image of a state of a storage element, such as a disk, a volume, or a file system, etc., at a particular point in time. Each snapshot stored in the snapshot database 125 can have an associated snapshot identifier (ID), such as a snapshot virtual identifier, and an associated date and/or time (e.g., timestamp) when the snapshot was created.

The replication component 115 can communicate with the replication settings database 120 and/or the UI component 130 to determine when to initiate communications with another storage system 180 using a predefined protocol to perform a data replication process. Depending on implementation, communications between storage systems can be initiated either by a source storage system or a destination storage system. In one example, the replication component 115 can receive or detect a trigger 112 that instructs the replication component 115 that a particular data replication process is to be performed. The trigger 112 can specify information about the data replication to be performed, including the type of replication (e.g., mirroring, periodic backup, cascading backup, etc.) and/or what data is to be replicated (e.g., what set of data or where storage element, such as a disk, a volume, or a file system, etc.).

For example, the UI component 130 can be associated with the replication manage 110 to provide user interfaces 131. A user of the storage system 100 can interact with the user interface 131 for purposes of configuring replication settings for the storage system 100. The user interfaces 131 can be provided, for example, on a display device of a computing system or server that implements the storage system 110. The user can interact with the user interfaces 131 by providing user input 132 corresponding to various replication settings 133 for the replication manage 110 and/or the storage system 110 in general. The replication settings 133 can be stored in the replication settings database 120. According to examples, the replication settings 133 can specify various operational aspects of the storage system 100, such as what data replication processes are to be performed, when the data replication processes are to be performed, what data is to be replicated, which user(s) has access to operate the storage system 100, what type of access the user(s) have, etc.

The replication component 115 can access the replication settings database 120 to determine when a data replication process is to be performed for the storage system 100. For example, for a periodic backup data replication process, the replication component 115 can detect or receive a trigger 112 every specified time period (e.g., periodically every twenty four hours, every forty eight hours, etc.) based on schedule information provided by the replication settings 133. In another example, the replication component 115 can detect or receive a trigger 112 in response to a user input 132, via the UI component 130, requesting that a data replication process should be performed (e.g., the user input 132 can be received at any time or intermittently). In this manner, communications for configuring a data replication process can be initiated in response to a user input 132 or based on predetermined schedule information.

A set of communications can be exchanged between the storage system 100 and another storage system 180 (e.g., a source storage system) for purposes of enabling data replication processes. As discussed, the storage systems 100, 180 can be heterogeneous storage systems, in which each storage system implements a different replication software or operating system, and/or implements a different file system or file layout. For example, one of the storage systems can implement Write Anywhere File Layout (WAFL) from NetApp Inc., of Sunnyvale, Calif., while another storage system can implement MetaWAFL from NetApp Inc. In other examples, the storage systems can originate from entirely different vendors that operate different software. In order for heterogeneous storage systems to communicate with each other for purposes of performing data replication processes, each storage system can use a common protocol with defined protocol messages.

A set of specified protocol messages for the common protocol can be associated with a corresponding set of requests. These associated set of protocol messages can be stored in a protocol message library database 150. The associated set of protocol messages can be provided to the storage system 100 (and to other storage systems 180). In one example, the protocol can be defined in the individual storage systems by installing a feature, an application, or a plug-in application to interface with the existing replication software, operating system, or file system or layout of the individual storage systems (e.g., the protocol can be added to existing systems as a layer of virtualization).

For example, an example set of protocol messages can include: GET_NEW_REFERENCE_SNAPSHOT, LIST_SNAPSHOTS, START_TRANSFER, ADD_REFERENCE, REMOVE_REFERENCE, etc. The GET_NEW_REFERENCE_SNAPSHOT protocol message can correspond to a request (by a destination storage system) for a snapshot (e.g., a reference snapshot) or snapshot information from a source storage system, while the LIST_SNAPSHOTS protocol message can correspond to a request (by a destination storage system) for a list or plurality of snapshots identifiers that is associated with an identifier of the destination storage system. In another example, the START_TRANSFER protocol message can correspond to a request to initiate a transfer of data (e.g., either full transfer or incremental transfer based on other information provided with the protocol message). The ADD_REFERENCE and REMOVE_REFERENCE protocol messages can correspond to a request to apply a lock to a snapshot and a request to remove a lock to a snapshot, respectively. The various protocol messages can be exchanged between storage systems with additional information and identifiers for appropriately implementing the data replication process.

In one example, for individual storage systems, the set of protocol messages can be associated with a corresponding set of requests that is tailored to or specified for that individual storage system. For example, the storage system 100 can implement a file system (or file layout) A, while the source storage system 180 implements a file system (or file layout) B, that is different from the file system A. In the storage system 100, the set of protocol messages can be associated with a corresponding set of requests, which can be in a form that is capable of being interpreted or translated by the replication manage 110 (e.g., capable of being understood by the file system A). Similarly, in the source storage system 180, the same set of protocol messages can be associated with a similar corresponding set of requests, which can be in a different form that is capable of being interpreted or translated by the replication manage 110 of the source storage system 180 (e.g., capable of being understood by the file system B). The respective system interfaces 160 of the storage systems 100, 180 can use the associated set of protocol messages (e.g., use the mapping stored in the respective protocol message library databases 150) to enable the storage systems 100, 180 to communicate with each other.

When the replication component 115 is triggered to implement a data replication process, such as an asynchronous mirroring data replication process, for example, the replication manage 110 can initiate communications with a replication manage 110 of the source storage system 180. The communications can enable the storage system 100 (e.g., the destination storage system in this example) to connect to the source storage system 180 for purposes of enabling data replication. The replication component 115, for example, can make a request 161 for a reference snapshot. The reference snapshot can be a point-in-time representation of data that is stored in a specified storage element, such as a disk, a volume, or a file system, etc., of the source storage system 180.

According to an example, the system interface 160 can access the protocol message library database 150 to determine the corresponding protocol message for the request 161 for the reference snapshot. The system interface 160 can then transmit a first protocol message 181 corresponding to that request 161 to the source storage system 180. In one example, the request 161 can also include an identifier of the storage system 100, a name of the reference snapshot, and/or information about whether the source storage system 180 is to create the reference snapshot or identify an existing snapshot having the name of the reference snapshot. As described herein, a name of a snapshot can correspond to a human-readable name that uniquely identifies or addresses a particular snapshot.

The source storage system 180 can receive the first protocol message 181, and can access its own protocol message library database 150 to interpret the first protocol message 181 and determine what request is being made. The replication manage 110 of the source storage system 180 can then perform the appropriate action based on the received request. In this example, the replication manage 110 of the source storage system 180 can determine that the storage system 100 requested a reference snapshot. The replication manage 110 of the source storage system 180 either create a new snapshot at an instance of time as a reference snapshot or find an existing previously generated snapshot (stored in its snapshot database 125) based on the information received with the request. Still further, in one example, the replication manage 110 of the source storage system 180 can apply a snapshot lock to the reference snapshot using the identifier of the storage system 100. The storage system 100 can then be associated with the lock (e.g., is an owner of the lock). A storage system 100, 180, as described in FIG. 1, supports the ability to lock a snapshot, so that user error or normal storage maintenance does not delete the snapshot. In other words, the lock can prevent a snapshot from being modified or deleted by a user or by another system that is not the owner of the lock. The source storage system 180 can then provide the reference snapshot identifier (ID) 162 to the storage system 100.

The replication component 115 can also send a request 163 for a list of snapshots associated with an identifier of the storage system 100 to the source storage system 180. Again, the system interface 160 can access the protocol message library database 150 and transmit the request 163 as a second protocol message 181 to the source storage system 180. The replication manage 110 of the source storage system 180 can receive the request, access its snapshot database 125, identify snapshots (e.g., identifying snapshot IDs 122 from its snapshot database 125) that are associated with the identifier of the storage system 100 making the request, and transmit a plurality of snapshot IDs 164 to the storage system 100. The replication component 115 of the storage system 100 can use the received list or plurality of snapshot IDs 164 to determine what data and/or what type of data replication transfer (e.g., full data transfer or incremental data transfer) is to be requested.

In one example, if this is the first time the storage system 100 is to perform a data replication process with the source storage system 180, the replication component 115 can make a request 165 for a full data transfer of data in a storage element corresponding to the reference snapshot. For example, if the reference snapshot is for a particular file directory that is to be backed up, the request 165 for the full data transfer can be for all the data stored with or as part of the file directory as represented by the reference snapshot at a point in time (e.g., all data and/or metadata represented in the reference snapshot as of the time the reference snapshot was generated by the source storage system 180). Again, the request 165 can be translated to a protocol message 181 and transmitted to the source storage system 180. The source storage system 180 can interpret the request from the protocol message 181 and the replication manage 110 of the source storage system 180 can respond to the request by transmitting the requested data 166 for backup to the storage system 100, thereby initiating the data replication process. The replication component 115 can store the data 166 in the data store 170.

In another example, the storage system 100 can make a request 165 for an incremental data transfer to receive data corresponding to changes made at the source storage system 180 since the last time the storage system 100 performed the data replication process with that source storage system 180. Again, if the reference snapshot is for a particular file directory that is to be backed up, for example, the replication component 115 can use the plurality of snapshot IDs 164 received and compare it with snapshot IDs 122 in its snapshot database 125 in order to determine a common snapshot. A common snapshot can represent a snapshot that was previously used to perform a data replication process between the storage system 100 and the source storage system 180. For instance, the common snapshot can indicate a previous reference snapshot used by the storage systems 100, 180 the last time the data replication process for specified data took place. The replication component 115 can make a request 165 for an incremental data transfer of data and changes made to data between the last common snapshot and the reference snapshot. The source storage system 180 can respond to this request and transmit the relevant data 166 to the source storage system. The replication component 115 can store that data 166 in the data store 170.

As an addition or an alternative, the storage system 100 can correspond to both a source storage system and a destination storage system in implementations where multiple storage systems are arranged to perform data replication processes in a cascading format (e.g., arranged as daisy chains). For example, data from a first storage system 180 can be replicated to the storage system 100, which can then behave as the source storage system as to another (second) storage system 180, so that the data can be replicated from the storage system 100 to the second storage system 180. In this manner, a storage system can be a destination system as compared to a system that provides the data, and can be a source system as compared to another system that is to receive the data. In such examples, the storage systems in the cascading configuration can each implement the protocol to arrange the data replication process between adjacent storage systems. The protocol can facilitate propagation of data through use of snapshots.

According to an example, in a cascading arrangement of three or more systems, each time a relationship (between a source system S1 and a destination system S2) establishes or determines a common snapshot, as discussed above, the source system S1 of that relationship can lock the common snapshot at the source system S1. In the cascade chain, the destination system S2 can transmit a request to lock the common snapshot (for purposes of using that common snapshot for data transfer) to the source system S1 only if it has a lock for a common snapshot for some other destination system, a system S3 (e.g., another system that is to receive data from that destination system S2). In this manner, the protocol facilitates propagation of snapshot locks upstream in the cascade chain. Similarly, the destination system S2 can transmit a request to unlock the common snapshot with the source system S1 after completion of data transfer, for example, when a commons snapshot at the destination system S2 is no longer locked.

Methodology

Figure 2:
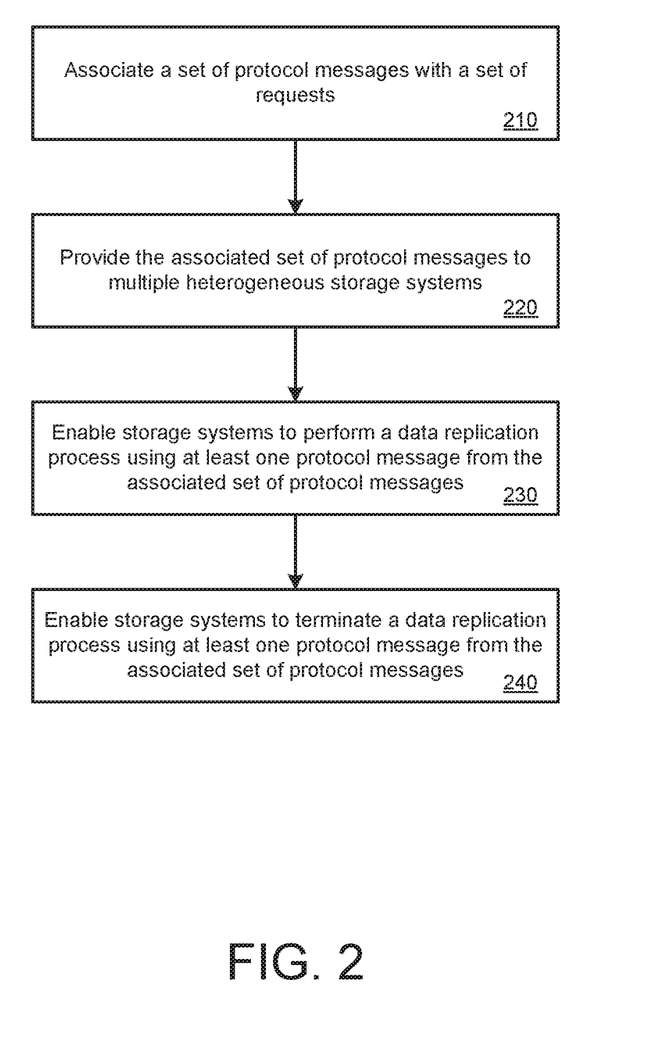
FIG. 2 illustrates an example method for enabling data replication between storage systems.

FIG. 2 illustrates an example method for enabling data replication between storage systems. A method such as described by an example of FIG. 2 can be implemented using, for example, components described with an example of FIG. 1. Accordingly, references made to elements of FIG. 1 are for purposes of illustrating a suitable element or component for performing a step or sub-step being described.

Referring to FIG. 2, a set of protocol messages can be associated with a set of requests (210). The set of protocol messages can be defined for a general-purpose control protocol, for example, that can be implemented and used by storage systems for purposes of enabling data replication processes. In one example, the protocol enables a destination storage system to connect with a source storage system, request the creation of a new snapshot, establish a common snapshot, and initiate a data transfer. In addition, special protocol extensions can be provided to ensure that common snapshots are not lost due to user error or discretionary space management operations, such as by using locks and making snapshots persistent (e.g., a referenced or locked snapshot at a storage system cannot be deleted by operations of that storage system).

According to some examples, for individual storage systems, the set of protocol messages can be associated with a corresponding set of requests that is tailored to or specified for that individual storage system. These associated set of protocol messages can be provided to the storage systems so that individual storage systems can store the associated set of protocol messages in a protocol message library database (220). By referencing or accessing the library database when a request is made by a storage system and/or received by another storage system, the storage systems can be enabled to perform a data replication process using at least a protocol message from the associated set of protocol messages (230).

In one example, a protocol message that is used by a source storage system and a destination storage system can correspond to a request for a list (or plurality) of snapshots stored at the source storage system. The source storage system can provide, to the destination storage system a list of snapshots or snapshot IDs that are associated with that destination storage system in response to the request. Data replication can be made possible by using at least some information provided in the list of snapshots. The destination storage system can determine a common snapshot from the list of snapshots, and use the common snapshot to determine what data needs to be received from the source storage system during the data replication process.

In some variations, the protocol can also enable the storage systems to terminate the communications between each other for purposes of data replication (e.g., after transmission of the requested data to be replicated is completed from the source storage system to the destination storage system) using at least a protocol message from the associated set of protocol messages (240). For example, after completion of data transfer in a periodic backup data replication process, the destination storage system can transmit a protocol message corresponding to a request to remove a lock from a most recent transferred snapshot.

Figure 3A:
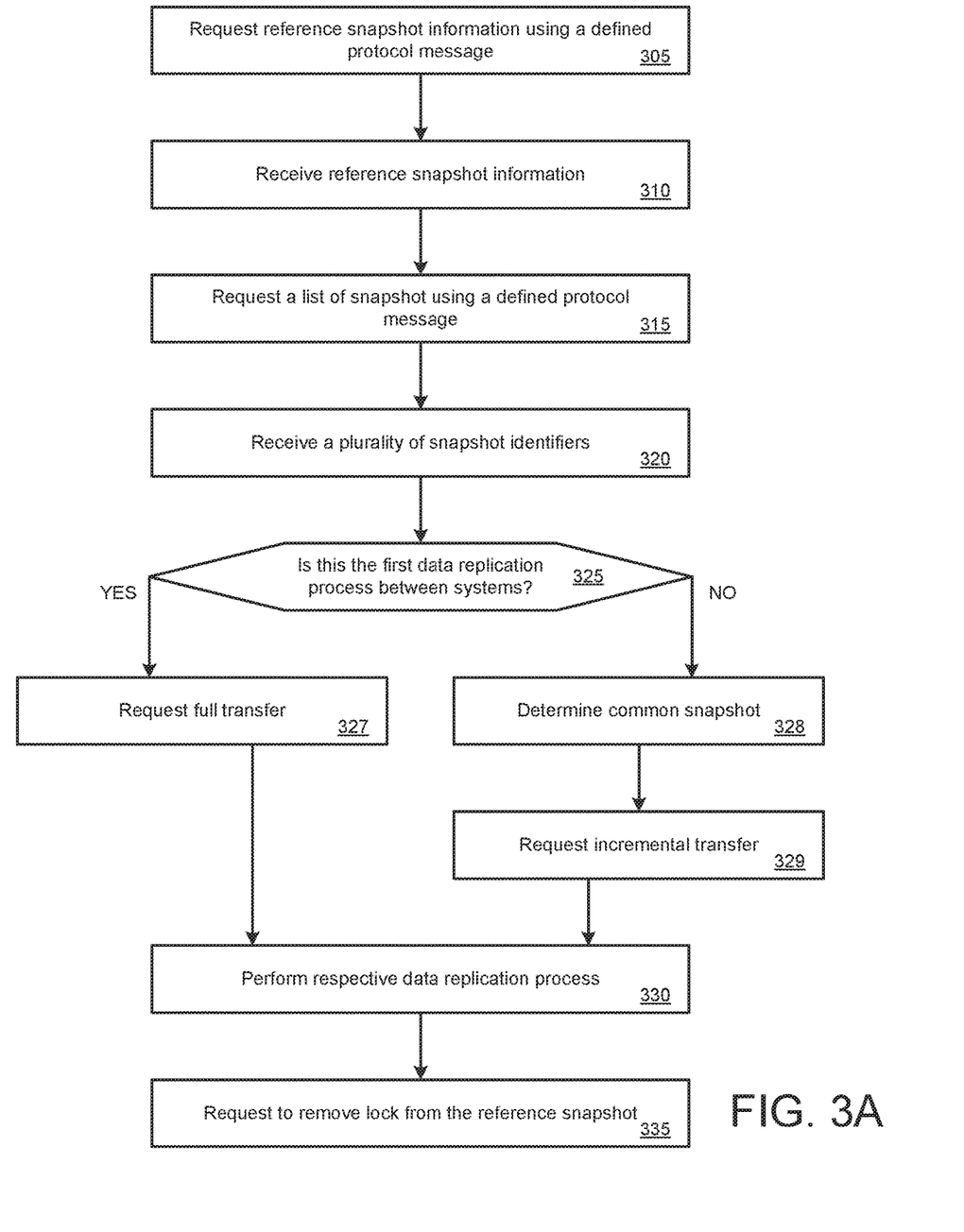
FIGS. 3A and 3B illustrate example methods of using a predefined protocol for implementing data replication processes.
Figure 3B:
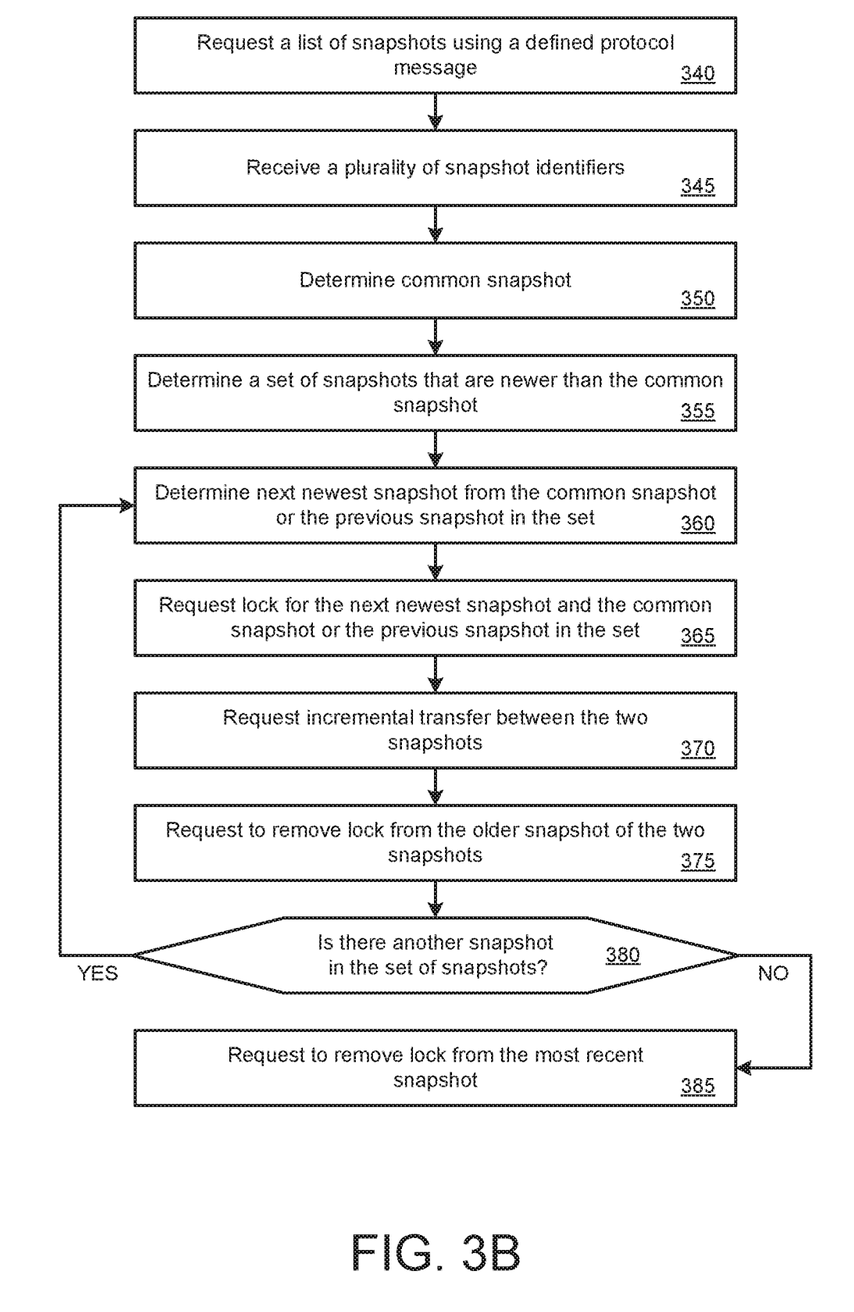

FIGS. 3A and 3B illustrate example methods of using a predefined protocol for implementing data replication processes. Methods such as described by examples of FIGS. 3A and 3B can be implemented using, for example, components described with an example of FIG. 1. Accordingly, references made to elements of FIG. 1 are for purposes of illustrating a suitable element or component for performing a step or sub-step being described.

FIG. 3A illustrates a method of using the predefined protocol for implementing an asynchronous mirroring data replication process. In the example of FIG. 3A, the destination storage system can make a request, to a source storage system, for a reference snapshot of a storage element or snapshot information using a first defined protocol message (305). The storage element can store data to be replicated between the destination storage system and the source storage system that stores the storage element. The first protocol message can correspond to the request for the reference snapshot (e.g., GET_NEW_REFERENCE_SNAPSHOT protocol message), and can also include an identifier of the destination storage system, a name of the reference snapshot, and/or information about whether the source storage system is to create the reference snapshot or identify an existing snapshot having the name of the reference snapshot. The destination storage system can make the request asynchronously (or intermittently) based on receiving user input to perform a mirroring data replication process. For example, the source storage system can be configured to generate a new snapshot every predetermined time period (e.g., every hour, every twelve hours, etc.). The destination storage system can transmit the request and cause the source storage system to asynchronously generate a new snapshot at an instance in time.

In response to receiving the request, the source storage system can create a new snapshot or identify/find an existing snapshot with the given name. The source storage system can also apply a lock to the snapshot to set the snapshot as the reference snapshot using the identifier of the destination storage system. The source storage system can then transmit a snapshot identifier of the reference snapshot to the destination storage system (310).

The destination storage system can transmit a request for all snapshots from the source storage system that is associated with the destination storage system (or is locked using the identifier of the destination storage system) using a protocol message, e.g., LIST_SNAPSHOTS (315). For example, the destination storage system can be the lock owner one or more of the snapshot locks (if any). The source storage system can respond to the request by identifying all snapshot identifiers where the snapshot owner matches the destination storage system. The destination storage system can receive the list or plurality of these snapshot identifiers from the source storage system (320).

According to an example, the destination storage system can use the list or plurality of snapshot identifiers to determine which snapshot should be the base snapshot. A base snapshot can be a snapshot that indicates a previous point in time at which data in the storage element was replicated from the source storage system to the destination storage system using that snapshot (if any). A base snapshot can be, for example, a common snapshot between the systems, as previously discussed. The destination storage system can determine if data replication (e.g., of data in the storage element) has been performed between the source storage system and the destination storage system (325).

In one example, the destination storage system can determine if data replication has been performed between the systems by determining if a base snapshot exists in the list. If the destination storage system has not previously replicated data in the storage element from the source storage system, and the communications have been established to initiate the first data replication between the systems, the destination storage system can transmit a request for a full data transfer to the source storage system using a protocol message, e.g., START_TRANSFER (327). The source storage system can perform a data replication process of a full data transfer of data in the storage element as represented by the reference snapshot at a point in time (e.g., all data and/or metadata represented in the reference snapshot as of the time the reference snapshot was generated by the source storage system) (330).

On the other hand, if a previous data replication process has been performed between the systems, then the destination storage element can determine the latest common snapshot of the systems (e.g., the common snapshot with the most recent time stamp) by comparing the snapshot identifiers (e.g., along with the timestamps of those snapshot identifiers) with the snapshot information stored in its snapshot database (328). The latest common snapshot can indicate a previous reference snapshot used by the storage systems the last time the data replication process for the specified data (of the storage element) took place. The destination storage system can transmit a request for incremental data transfer of data and changes made to data between the latest common snapshot and the reference snapshot (329). The source storage system can perform a data replication process of an incremental data transfer of data in the storage element and changes made to data in the storage element from a time corresponding to the latest common snapshot to a time corresponding to the reference snapshot (330).

Upon completion of the data replication process, the destination storage system can use the protocol to transmit a request, to the source storage system, to remove the lock from the reference snapshot (335). In one example, the source storage system can remove the lock by disassociating the reference snapshot from the identifier of the destination storage system, e.g., via a specialized CLI. For example, a snapshot (at a source storage system) can be locked by multiple destination storage systems. The source storage system can remove the reference for a given destination storage system where the protocol message, REMOVE_REFERENCE, originated. In another example, the source storage system can remove the lock by automatically deleting the reference snapshot. In such an example, the destination storage system can prevent the snapshot from being deleted and override the source storage system's delete operation by setting a bit in the REMOVE_REFERENCE protocol message.

In another example, the source storage system can initiate communications with the destination storage system for purposes of performing a data replication process using protocol messages. For example, the source storage system can be triggered to create a new reference snapshot (e.g., in response to user input), and can transmit an identifier of the new reference snapshot to the destination storage system that is to provide a backup storage for the source storage system. The destination storage system can provide a confirmation that the data replication process can be performed. The source storage system can perform a lookup of its list of stored snapshots to identify the common snapshot associated with the destination storage system, and determine the data to be transmitted to the destination storage system.

FIG. 3B illustrates a method of using the predefined protocol or implementing a periodic backup data replication process. In some examples, a destination storage system can periodically initiate communications with a source storage system to perform periodic backup data replication processes. The destination storage system, for example, can be scheduled to perform a backup of data of a storage element of the source storage system every predefined period (e.g., every twenty four hours, every week, etc.). The destination storage system can perform periodic backup data replication process using protocol messages of the general-purpose control protocol.

In the example of FIG. 3B, the destination storage system can be triggered, based on the schedule, to initiate communications with the source storage system using a protocol message. The destination storage system can make a request, to the source storage system, for a list of (or plurality of) snapshots using a first protocol message, e.g., LIST_SNAPSHOTS (340). According to an example, the request can be for snapshots that are associated with the destination storage system or are locked with the destination storage system designated as being the owner of the locks. The destination storage system can receive the plurality of snapshot identifiers that are associated with the destination storage system (345).

In one example, the destination storage system can determine the latest common snapshot between the destination storage system and the source storage system (350). The latest common snapshot can indicate a previous snapshot used by the storage systems the last time the periodic backup process for the specified data of the storage element took place. In addition, the destination storage system can determine a set of snapshots that are newer than the latest common snapshot from the plurality of snapshots (concurrently or before or after determining the latest common snapshot, depending on different variations) (355). According to an example, the set of snapshots can be specifically selected snapshots that meet selection criteria, where the selection criteria can be defined in terms of a policy object. For example, a specified set of snapshots can be selected and used to perform selective data transfer, as opposed to data transfer of all changes made to data between the latest snapshot and the current, most recent snapshot.

The destination storage system can determine the next newest snapshot from the latest common snapshot in the set (360), and send a request to the source storage system to lock this next newest snapshot and the latest common snapshot using a protocol message, such as the ADD_REFERENCE protocol message (365). The destination storage system can transmit a request to initiate incremental data transfer of data and changes made to data between the latest common snapshot and this next newest snapshot in the set using the protocol, e.g., the START_TRANSFER protocol message (370). The source storage system can respond to the request by starting the data replication process and transmitting the requested data to the destination storage system. The destination storage system can store the data in its data store. Once the transfer of data is completed, the destination storage system can transmit a request to remove the lock from the latest common snapshot using a protocol message, such as REMOVE_REFERENCE (375).

If there is another snapshot in the set of snapshots (380), the destination storage system can then determine the next newest snapshot from the previously determined snapshot in the set, and repeat the steps 365-375 (e.g., perform additional iterations) until it has reached the end of the selected set of snapshots. For example, if Snapshot0 is determined to be the latest common snapshot and there are three snapshots in the selected set, Snapshot1, Snapshot2, Snapshot3 in the order of oldest snapshot to most recent snapshot, the destination storage system can determine that Snapshot1 is the next newest snapshot from the common snapshot. Snapshot0 and Snapshot1 can be locked by the source storage system in response to the request, ADD_REFERENCE, and data and changes to data made between Snapshot0 and Snapshot1 can be received by the destination storage system. The lock on Snapshot0 can be removed, and then the destination storage system can determine the next newest snapshot from Snapshot1, which would be Snapshot2. The destination storage system can perform similar steps with Snapshot1 and Snapshot2 so that data and changes to data made between Snapshot1 and Snapshot2 can be received by the destination storage system. The iterations can be continued until after Snapshot3 is used for data replication.

When all data transfers have been completed using the selected set of snapshots, the destination storage system can send a request to the source storage system to remove the lock from the most recent snapshot using a protocol message, e.g., REMOVE_REFERENCE (385). In the example above, the destination storage system requests the source storage system to remove the lock from the most recent snapshot, Snapshot3. The destination storage system can perform the method of FIG. 3B the next time (e.g., the next period) it is triggered to communicate with the source storage system for performing the periodic backup data replication process.

Hardware Diagram

Figure 4:
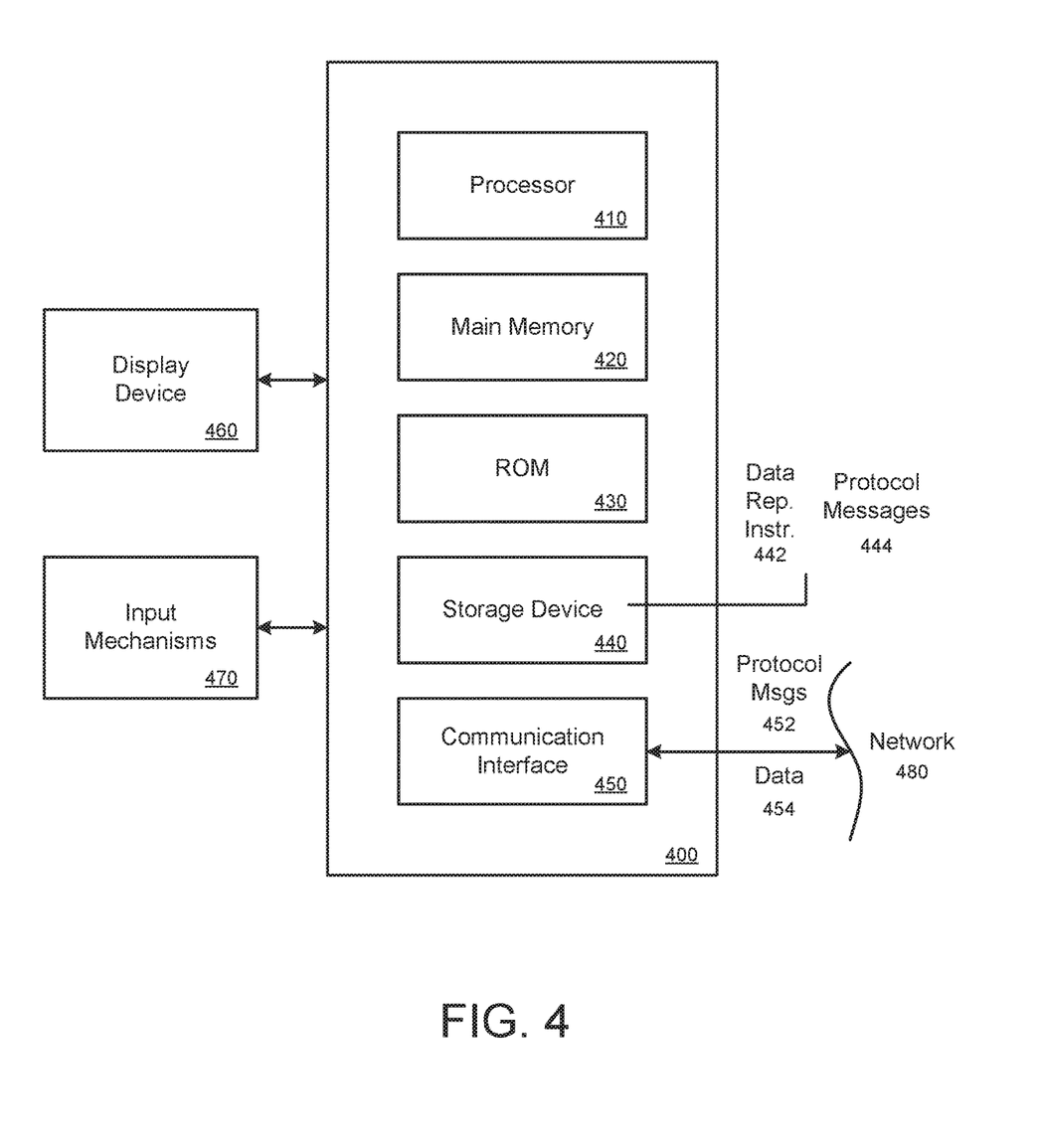
FIG. 4 is a block diagram that illustrates a computer system upon which examples described herein may be implemented.

FIG. 4 is a block diagram that illustrates a computer system upon which examples described herein may be implemented. For example, in the context of FIG. 1, a storage system 100 may be implemented using a computer system such as described by FIG. 4. The storage system 100 may also be implemented using a combination of multiple computer systems as described by FIG. 4.

In one implementation, computer system 400 includes processing resources 410, main memory 420, ROM 430, storage device 440, and communication interface 450. Computer system 400 includes at least one processor 410 for processing information and a main memory 420, such as a random access memory (RAM) or other dynamic storage device, for storing information and instructions to be executed by the processor 410. Main memory 420 also may be used for storing temporary variables or other intermediate information during execution of instructions to be executed by processor 410. Computer system 400 may also include a read only memory (ROM) 430 or other static storage device for storing static information and instructions for processor 410. A storage device 440, such as a magnetic disk or optical disk, is provided for storing information and instructions. For example, the storage device 440 can correspond to a computer-readable medium that stores data replication instructions 442 that, when executed by processor 410, may cause system 400 to perform operations described below and/or described above with respect to FIGS. 1 through 3B (e.g., operations of systems 100, 180 described above). The storage device 440 can also store a snapshot database as well as a database or library of predefined protocol messages 444.

The communication interface 450 can enable computer system 400 to communicate with one or more networks 480 (e.g., computer network, cellular network, etc.) through use of the network link (wireless or wireline). Using the network link, computer system 400 can communicate with a plurality of systems, such as other data storage systems. In one example, computer system 400 can use one or more protocol messages 452 to exchange communications in order to establish a data replication session with another computer system (not shown) via the network link, such as described with respect to FIGS. 1 through 3B. Individual protocol messages 452 can be associated with individual data requests for enabling data replication processes to be performed between source and destination storage systems, including between heterogeneous storage systems. Based on the exchanged information as a result of using the protocol messages 452, data 454 can be transmitted from the source storage system for storage in the destination storage system.

Computer system 400 can also include a display device 460, such as a cathode ray tube (CRT), an LCD monitor, or a television set, for example, for displaying graphics and information to a user. An input mechanism 470, such as a keyboard that includes alphanumeric keys and other keys, can be coupled to computer system 400 for communicating information and command selections to processor 410. Other non-limiting, illustrative examples of input mechanisms 470 include a mouse, a trackball, touch-sensitive screen, or cursor direction keys for communicating direction information and command selections to processor 410 and for controlling cursor movement on display 460.

Examples described herein are related to the use of computer system 400 for implementing the techniques described herein. According to one example, those techniques are performed by computer system 400 in response to processor 410 executing one or more sequences of one or more instructions contained in main memory 420. Such instructions may be read into main memory 420 from another machine-readable medium, such as storage device 440. Execution of the sequences of instructions contained in main memory 420 causes processor 410 to perform the process steps described herein. In alternative implementations, hard-wired circuitry may be used in place of or in combination with software instructions to implement examples described herein. Thus, the examples described are not limited to any specific combination of hardware circuitry and software.

It is contemplated for examples described herein to extend to individual elements and concepts described herein, independently of other concepts, ideas or system, as well as for examples to include combinations of elements recited anywhere in this application. Although examples are described in detail herein with reference to the accompanying drawings, it is to be understood that the concepts are not limited to those precise examples. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude having rights to such combinations.

What is being claimed is:

1. A method, comprising:
   in response to establishing a first common snapshot between a first system and a second system, setting a source lock for the first common snapshot to lock the first common snapshot for the first system as a source of a first relationship between the first system and second system;
   propagating snapshot locks upstream in a cascade chain that includes the first system, the second system, and a third system, wherein the propagating comprises: if the second system has a lock for a second common snapshot with the third system that is to receive data from the second system, then allowing the second system to transmit a request to the first system for setting a destination lock for the first common snapshot for performing a data transfer from the first system to the second system as a destination; and
   in response to the first common snapshot being locked for the first system with the source lock and locked for the second system with the destination lock, performing the data transfer from the first system to the second system based upon the first common snapshot.

2. The method of claim 1, wherein the lock, the source lock, and the destination lock are part of a propagation of snapshot locks upstream in a cascade chain comprising the first system, the second system, and the third system.

3. The method of claim 1, comprising:
   transmitting a request from the second system to the first system to unlock the first common snapshot with the first system in response to the data transfer completing and a common snapshot at the second system no longer being locked.

4. The method of claim 1, comprising:
   evaluating a set of snapshot identifiers to identify a base snapshot indicating a prior point in time at which a storage element was replicated.

5. The method of claim 4, comprising:
determining that data replication has been previously performed based upon the base snapshot existing within the set of snapshot identifiers.

6. The method of claim 1, comprising:
in response to a set of snapshot identifiers not comprising a base snapshot identifier of a base snapshot common to the first system and the second system, transmitting a protocol message to the second system to trigger the second system to perform a full data transfer to the first system as a data replication process.

7. The method of claim 6, wherein the full data transfer is of data in storage elements as represented by a reference snapshot at a point in time the reference snapshot was generated by the second system.

8. The method of claim 1, comprising:
comparing a set of snapshot identifiers and timestamps of the set of snapshot identifiers with snapshot information stored within a snapshot database of the first system to identify a latest common snapshot last used by the first system and the second system to perform a prior data replication process.

9. The method of claim 8, comprising:
transmitting a protocol message to the second system to trigger the second system to perform an incremental data transfer of data and changes made to the data between a common snapshot of a reference snapshot as a data replication process.

10. A non-transitory machine readable medium comprising instructions for performing a method, which when executed by a machine, causes the machine to:
in response to establishing a first common snapshot between a first system and a second system, setting a source lock for the first common snapshot to lock the first common snapshot for the first system as a source of a first relationship between the first system and second system;
propagate snapshot locks upstream in a cascade chain that includes the first system, the second system, and a third system, wherein the propagating comprises: if the second system has a lock for a second common snapshot with the third system that is to receive data from the second system, then allowing the second system to transmit a request to the first system for setting a destination lock for the first common snapshot for performing a data transfer from the first system to the second system as a destination; and
in response to the first common snapshot being locked for the first system with the source lock and locked for the second system with the destination lock, perform the data transfer from the first system to the second system based upon the first common snapshot.

11. The non-transitory machine readable medium of claim 10, wherein a set of snapshot identifiers correspond to snapshots having an owner matching the first system.

12. The non-transitory machine readable medium of claim 11, wherein the instructions cause the machine to:
evaluate the set of snapshot identifiers to identify a base snapshot indicating a prior point in time at which a storage element was replicated from the second system to the first system using the base snapshot, wherein the base snapshot is used to perform data replication.

13. The non-transitory machine readable medium of claim 12, wherein the base snapshot comprises a common snapshot between the first system and the second system.

14. The non-transitory machine readable medium of claim 12, wherein the instructions cause the machine to:
determine that data replication has been previously performed based upon the base snapshot existing within the set of snapshot identifiers.

15. The non-transitory machine readable medium of claim 10, wherein the instructions cause the machine to:
in response to a set of snapshot identifiers not comprising a base snapshot identifier of a base snapshot common to the first system and the second system, transmit a protocol message to the second system to trigger the second system to perform a full data transfer to the first system as a data replication process.

16. The non-transitory machine readable medium of claim 15, wherein the full data transfer is of data in storage elements as represented by a reference snapshot at a point in time the reference snapshot was generated by the second system.

17. The non-transitory machine readable medium of claim 10, wherein the instructions cause the machine to:
compare a set of snapshot identifiers and timestamps of the set of snapshot identifiers with snapshot information stored within a snapshot database of the first system to identify a latest common snapshot last used by the first system and the second system to perform a prior data replication process.

18. The non-transitory machine readable medium of claim 17, wherein the instructions cause the machine to:
transmit a third message to the second system to trigger the second system to perform an incremental data transfer of data and changes made to the data between a common snapshot of a reference snapshot as a data replication process.

19. A computing device comprising:
a memory comprising machine executable code for performing a method; and
a processor coupled to the memory, the processor configured to execute the machine executable code to cause the processor to:
in response to establishing a first common snapshot between a first system and a second system, setting a source lock for the first common snapshot to lock the first common snapshot for the first system as a source of a first relationship between the first system and second system;
propagating snapshot locks upstream in a cascade chain that includes the first system, the second system, and a third system, wherein the propagating comprises: if the second system has a lock for a second common snapshot with the third system that is to receive data from the second system, then allowing the second system to transmit a request to the first system for setting a destination lock for the first common snapshot for performing a data transfer from the first system to the second system as a destination; and
in response to the first common snapshot being locked for the first system with the source lock and locked for the second system with the destination lock, perform the data transfer from the first system to the second system based upon the first common snapshot.

20. The computing device of claim 19, wherein a set of snapshot identifiers correspond to snapshots having an owner matching the first system.

* * * * *